(12) United States Patent
Baumann

(10) Patent No.: US 7,866,695 B2
(45) Date of Patent: Jan. 11, 2011

(54) ENERGY ABSORBING DEVICE

(75) Inventor: Karl-Heinz Baumann, Bondorf (DE)

(73) Assignee: Daimler AG, Stuttgart (DE)

( * ) Notice: Subject to any disclaimer, the term of this patent is extended or adjusted under 35 U.S.C. 154(b) by 603 days.

(21) Appl. No.: 11/793,918

(22) PCT Filed: Dec. 7, 2005

(86) PCT No.: PCT/EP2005/013099

§ 371 (c)(1),
(2), (4) Date: Oct. 17, 2007

(87) PCT Pub. No.: WO2006/072320

PCT Pub. Date: Jul. 13, 2006

(65) Prior Publication Data

US 2008/0093888 A1    Apr. 24, 2008

(30) Foreign Application Priority Data

Dec. 23, 2004    (DE) .................. 10 2004 062 097

(51) Int. Cl.
    *B60R 21/04* (2006.01)
(52) U.S. Cl. .................. 280/743.2; 267/118; 280/753
(58) Field of Classification Search .................. 267/118,
    267/120, 122; 280/728.1, 730.1, 730.2, 734,
    280/743.1, 743.2, 752, 753
    See application file for complete search history.

(56) References Cited

U.S. PATENT DOCUMENTS

| | | | | |
|---|---|---|---|---|
| 2,091,057 A | | 8/1937 | Straith | |
| 3,545,789 A | * | 12/1970 | Graham | .................. 280/753 |
| 5,189,110 A | | 2/1993 | Ikematu et al. | |
| 5,333,897 A | * | 8/1994 | Landis et al. | ............ 280/728.2 |
| 5,775,725 A | * | 7/1998 | Hodac et al. | ............ 280/728.2 |
| 5,794,975 A | | 8/1998 | Nohr et al. | |
| 6,174,008 B1 | | 1/2001 | Kramer et al. | |
| 6,338,501 B1 | | 1/2002 | Heilig et al. | |
| 6,464,255 B1 | * | 10/2002 | Preisler et al. | .............. 280/752 |
| 7,213,840 B2 | * | 5/2007 | Kumagai | .................. 280/752 |
| 2004/0108700 A1 | * | 6/2004 | Galmiche et al. | ........... 280/753 |

FOREIGN PATENT DOCUMENTS

DE    42 17 651 C1    7/1993

(Continued)

OTHER PUBLICATIONS

International Search Report dated Feb. 17, 2006 with English translation of relevant portion and Form PCT/ISA/237 (Eleven (11) Pages).

(Continued)

*Primary Examiner*—Christopher P Schwartz
(74) *Attorney, Agent, or Firm*—Crowell & Moring LLP

(57) ABSTRACT

An energy absorbing device for the interior of a motor vehicle of the specification is described. The device includes two elements which are arranged movably relative to one another, having at least one actuator which is arranged between these elements and at least one receiving apparatus on the elements for fastening the actuator. The energy absorbing device is simple to manufacture and takes up a small amount of installation space, it uses a receiving apparatus shaped as a recess which is made in the elements and encloses the actuator at least partially.

20 Claims, 5 Drawing Sheets

FOREIGN PATENT DOCUMENTS

| | | |
|---|---|---|
| DE | 198 28 444 A1 | 12/1999 |
| DE | 201 06 056 U1 | 8/2001 |
| DE | 20 2004 008 985 U1 | 9/2004 |
| EP | 1 464 548 A1 | 10/2004 |

OTHER PUBLICATIONS

German Office Action dated Apr. 15, 2005 with English translation of relevant portion (Fourteen (14) Pages).

Office Action dated Mar. 31, 2009, from European Patent Office, and partial English translation.

* cited by examiner

ENERGY ABSORBING DEVICE

CROSS REFERENCE TO RELATED APPLICATIONS

This application is a National Phase of PCT International Application No. PCT/EP2005/013099, filed Dec. 7, 2005, which claims priority under 35 U.S.C. §119 to German Patent Application No. 10 2004 062 097.0 filed Dec. 23, 2004, the entire disclosures of which are herein expressly incorporated by reference.

BACKGROUND AND SUMMARY OF THE INVENTION

The invention relates to an energy absorbing device for the interior of a motor vehicle, having two elements arranged movably to one another, one being fixed to a vehicle and the other transferable from an initial to an end position, and an actuator connected thereto.

It is known to arrange elements in the interior of motor vehicles, which elements are moved in the case of an impact. These elements can serve to steer a vehicle occupant in a defined direction during the impact. It is likewise known that the movable elements absorb energy in the event of contact with the occupant and thus reduce the consequences of an accident.

For instance, German Patent Document DE 20 2004 008 985 U1 shows an element which is arranged such that it can move relative to a vehicle door and can be transferred from an initial position into an end position by way of a very wide range of mechanisms. In one case, folding bellows arrangements are provided which expand when they are filled with air and, as a result, ensure that the movably arranged element is transferred from an initial position into an end position. Furthermore, different toggle lever arrangements are disclosed in conjunction with a linear drive. A prestressed spring, for example, can be used in the linear drive.

Known mechanisms for transferring the movable element from an initial position into an end position also take up a certain amount of space in the initial position, with the result that corresponding installation space has to be made available behind the movable element. Furthermore, in addition to the pure mechanisms, such as folding bellows and toggle lever, additional actuators are necessary, such as gas generator or linear drive, which likewise take up additional installation space.

One object of the present invention, therefore, is to provide an energy absorbing device for the interior of a motor vehicle, which is simple to manufacture and at the same time takes up a small amount of installation space. This and other objects and advantages are achieved by the energy absorbing device according to the invention, in which two elements are arranged movably relative to one another, one of which is fixed to the vehicle and the other can be transferred from an initial position into an end position, and an actuator is arranged between the elements and a receiving apparatus for fastening the actuator. According to the invention, the receiving apparatus is configured in such a way that it accommodates the actuator at least partially. In other words, the actuator can be arranged at least partially within the elements. The elements which are arranged movably relative to one another can be flat elements, such as parts of the interior trim or parts of seats, headrests, cockpit, etc. The arrangement of the actuators within the elements achieves the situation where they can be arranged very close to one another, that is to say at a minimum spacing from one another, at least in their initial position. Depending on how the dimensions of the actuator are adapted to the dimensions of the receiving apparatus, the spacing between the two elements can shrink toward zero.

The invention affords the advantage that the elements which are arranged movably relative to one another take up a small amount of space and can therefore be integrated into a vehicle interior in a simple way. Firstly, no additional installation space is required for this purpose; secondly, the elements which save space in this way can be designed in an optically pleasing manner and can therefore be placed unobtrusively in the interior.

It is envisioned that the actuator may be a spring. However, other exemplary actuators which can be integrated into the recesses which act as receiving apparatus can also be provided, such as cylinders, small motors, piezoelectric actuators, etc.

The spring can be configured, for example, as a spring which includes at least one limb, at least one winding and at least one further limb or hoop. In this example, two windings can also be provided, between which the hoop is arranged. Additional limbs can likewise be provided on those sides of the windings which lie opposite the hoop. A prestress can be built up with the aid of a spring of this type if the hoop is moved relative to the limbs. The movement takes place about a pivot axis which runs through the windings. The movably arranged element can be transferred from its initial position into an end position relative to the fixedly arranged element by way of a spring of this type, by the hoop performing a pivoting movement about the pivot axis which runs through the windings. For this purpose, it is required that a part of the spring, for example the windings with the limbs, is fastened to an element and the hoop is supported on the other element during the pivoting movement. The hoop can trigger a relative movement between the two elements via this supporting function. A movement of this type can also be carried out by any other type of spring, such as a helical spring. If springs are used as actuators, it is envisioned to set a defined amount of energy absorption via the spring force. The elements which are arranged movably relative to one another can therefore absorb a defined amount of energy in the event of an impact upon contact with an occupant.

The recess which acts as receiving apparatus can have a pin. This pin can be a separate component. However, it can also be formed by an integrally formed portion of the element. The pin can be oriented parallel to the direction of the extent of the element. In this case, the recess is designed as a U-shaped recess.

If the spring is arranged relative to the receiving apparatus in such a way that it encloses the pin which is arranged in the recess by way of one winding, this provides a particularly simple type of fastening or locking of the spring relative to one of the elements which are arranged movably relative to one another.

It is envisioned to provide a stop which limits a movement of the spring. A targeted movement of the elements which are arranged movably relative to one another can therefore be implemented. If the movement of the elements which are arranged movably relative to one another is caused by a pivoting movement of a hoop, it is envisioned to position the stop in such a way that the movement is stopped when the maximum distance of the two elements from one another is reached. The amount of energy absorption can be set in a particularly simple way via the positioning of the stop and the limiting of a movement of the spring.

The stop can be, for example, a projection which is arranged on one of the elements. Similarly to the pin, the projection can be configured as a separate component or as a projection which is formed integrally with the element.

The two elements can be connected to one another via fixing elements. The fixing elements are configured in such a way that they can be released in a defined vehicle situation. The actuator is released by the release of the fixing elements. If the actuator is a prestressed spring, the movement of the prestressed spring is initiated by the release of the fixing elements. If the actuator is a motor or piezoelectric actuator, it can also be triggered via a signal of a control device.

It is envisioned to arrange the two elements which are arranged movably relative to one another in a cover. If the cover is of gas-impermeable configuration, a vacuum can be generated in the cover, which vacuum can be canceled if the two elements should move relative to one another. A vacuum pump can be connected to the cover in order to generate the vacuum.

Other objects, advantages and novel features of the present invention will become apparent from the following detailed description of the invention when considered in conjunction with the accompanying drawings.

BRIEF DESCRIPTION OF THE DRAWINGS

In the following text, the invention will be explained in greater detail using the exemplary embodiments which are shown in the drawings, in which.

DETAILED DESCRIPTION OF THE DRAWINGS

Figure 1:
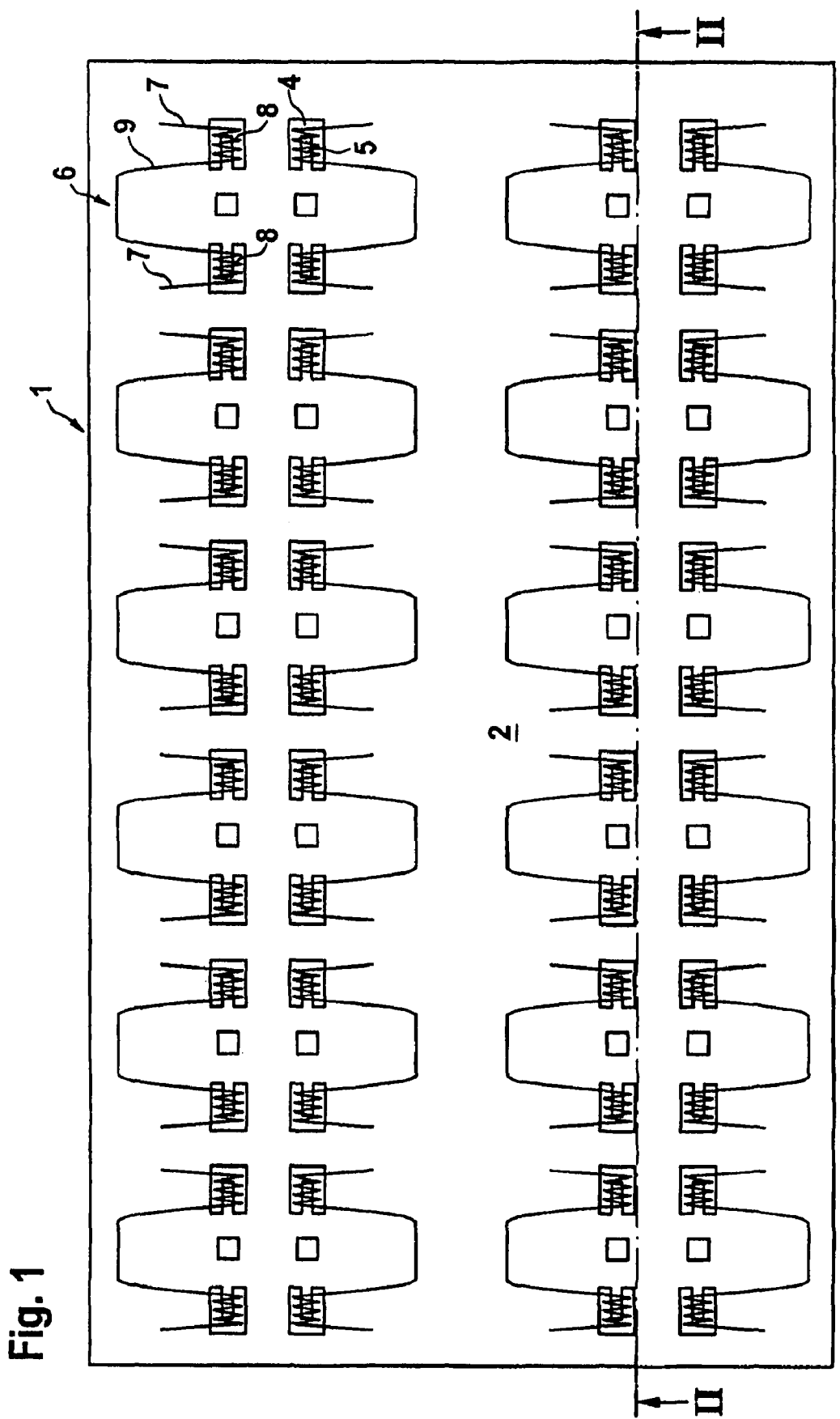
FIG. 1 shows a plan view of an energy absorbing device according to the invention.

FIG. 1 shows an energy absorbing device 1 according to an embodiment of the invention for the interior of a motor vehicle. The plan view shows one element 2 of two elements which are arranged movably relative to one another. The element 2 can be arranged fixedly on the vehicle. The element 2 can, however, also be an element which is arranged movably relative to the part which is fixed to the vehicle.

Recesses 4 which act as receiving apparatus are made in the element 2. The recesses 4 are U-shaped. A mandrel or pin 5 is therefore produced on one side of the recess 4. Furthermore, an actuator can be seen in the form of a spring 6. The spring 6 has two limbs 7, two windings 8 and a hoop 9. The hoop 9 is arranged between the two windings 9. The outer side of each winding 8 is adjoined in each case by a limb 7. The spring 6 is under prestress in the configuration which is shown, that is to say when the limbs 7 and the hoop 9 are arranged on one side of the windings.

Two recesses 4 are provided for each spring 6. The recesses 4 are arranged in each case in such a way with respect to one another that the pins 5 which are arranged in the recesses 4 are arranged on those sides of the recesses 4 which face one another. In other words, the open sides of the U of the recesses 4 point toward one another. The springs 6 are arranged in the recesses 4 in such a way that their windings 8 enclose the pin 5. The limbs 7 are then arranged on the side of the recesses 4 which do not have a pin 5. The hoop 9 adjoins that side of the recesses 4, on which the pin 5 is arranged. It is also envisioned that a reverse arrangement can be used in another embodiment. This provides a structurally very simple receiving apparatus for the springs 6.

A multiplicity of springs 6 are arranged on the element 2 which is shown. In the first row, these are all oriented in the same direction, so that their limbs 7 and hoop 9 all point in the same direction. In the row which is arranged beneath this, the springs 6 are arranged as a mirror image of the springs 6 of the first row, with their limbs 7 and hoop 9 point in the opposite direction.

The second row is adjoined by a third row, in which the springs are oriented in the same way as in the first row. The same is true for the adjoining fourth row in comparison with the second row.

In each case one further recess 11 is provided between the recesses 4. In the exemplary embodiment which is shown, this recess is rectangular and will be described in greater detail in conjunction with the following figures.

Figure 2:
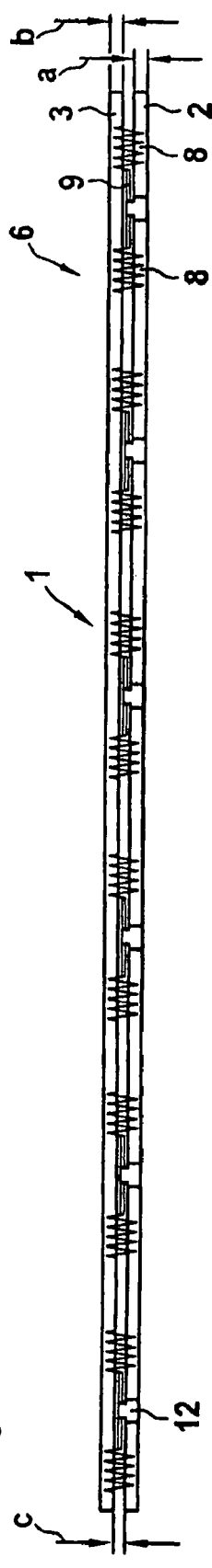
FIG. 2 shows a section through an energy absorbing device according to the invention in accordance with FIG. 1, along the line II-II in an initial position.

FIG. 2 shows a cross section through the above-described exemplary embodiment along the line II-II in FIG. 1. The lower plate represents the element 2 which is arranged fixedly on the vehicle and the upper plate represents the element 3 which is arranged such that it can be transferred from an initial position into an end position. Furthermore, springs 6 can be seen which are arranged between the elements 2 and 3. The windings 8 and the hoop 9 of the springs 6 can be seen. The recesses 4 have not been shown for reasons of clarity. The recesses 4 are situated, however, as shown in FIG. 1, at the level of the windings 8 and protrude into the windings 8 of the springs 6 by way of their pin 5. Recesses for the windings 8 are likewise provided in the element 3. However, these recesses do not have any pins 5 which engage into the windings 8.

Figure 4:
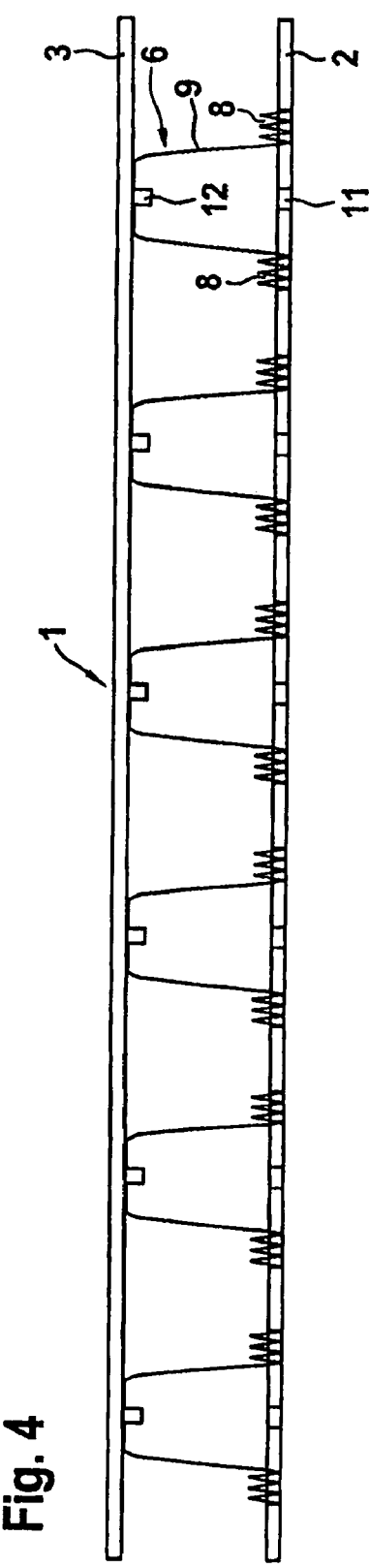
FIG. 4 shows a sectional illustration of the energy absorbing device according to the invention in accordance with FIG. 2, in an end position.

A projection 12 can be seen on the element 3 in the center of each spring 6. In the initial position (shown in FIG. 2) of the exemplary energy-absorbing device 1 according to the invention, the projections 12 protrude into the rectangular recesses 11. As a result, a movement of the elements 2 and 3 parallel to their direction of extent is prevented. In addition, the rectangular recesses 11 make it possible for the elements 2 and 3 to come to lie at a minimum spacing from one another in their initial position. The projections 12 act as a stop for the hoop 9 of the springs 6. This can be seen in FIG. 4, which shows the energy-absorbing device 1 according to the invention in its end position. The end position is distinguished by the fact that the hoops 9 of the springs 6 have completed a pivoting movement about an axis (not shown) which runs through the windings 8 of the springs 6. Here, they have exerted a force from the element 2 onto the element 3, as a result of which the latter has performed a movement. The movement has increased the spacing between the elements 2 and 3. In order to limit the movement of the element 3 relative to the element 2, the projections 12 are provided which represent a limit for the above-described pivoting movement of the hoop 9. Depending on in which position the projections 12 are arranged relative to the windings 8 of the springs, the movement of the hoops 9 is suppressed after a predefined opening angle and the spacing of the elements 2 and 3 is therefore defined in their end position.

The solution described according to the invention provides an energy absorbing device 1 which takes up a very small amount of installation space. This is achieved with an actuator that is arranged substantially in the region of congruence with the elements 2 and 3 in the initial position. It extends exclusively in the recesses 4 with its windings 8, with the result that the overall height of the energy absorbing device 1 is composed of the thicknesses a and b of the elements 2 and 3, and of a spacing c of the elements 2 and 3 from one another. This spacing c corresponds to the thickness of the hoop 9 of the springs 6 in the exemplary embodiment which is shown. If additional receptacles (not shown) are also provided in the elements 2 and 3 for the limbs 7 and the hoop 9, the spacing c can be minimized toward zero in the initial position of the elements 2 and 3, with the result that the thickness of the energy absorbing device 1 is now composed only of the thicknesses a and b of the elements 2 and 3.

Figure 3:
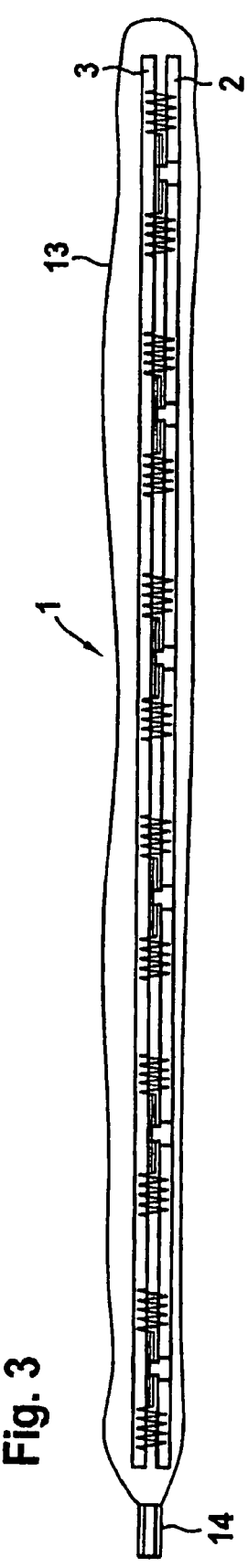
FIG. 3 shows a sectional illustration of the energy absorbing device according to the invention in accordance with FIG. 2, in a cover.

The exemplary embodiment which is shown in FIG. 3 differs from the above-described exemplary embodiment in that the elements 2 and 3 are arranged in a cover 13. The cover 13 is of gas-impermeable configuration, with the result that a vacuum can be established in it with the aid of the valve 14 and a vacuum pump (not shown). In this way, the cover 13 provides a device with which the elements 2 and 3 can be fixed in their initial position. As soon as a control device gives a signal that the element 3 is to be transferred into the end position relative to the element 2, the valve 14 is opened, the vacuum in the cover 13 is removed and the movement for the hoop 9 of the springs 6 is released, which transfer the element 3 into the end position.

Figure 5:
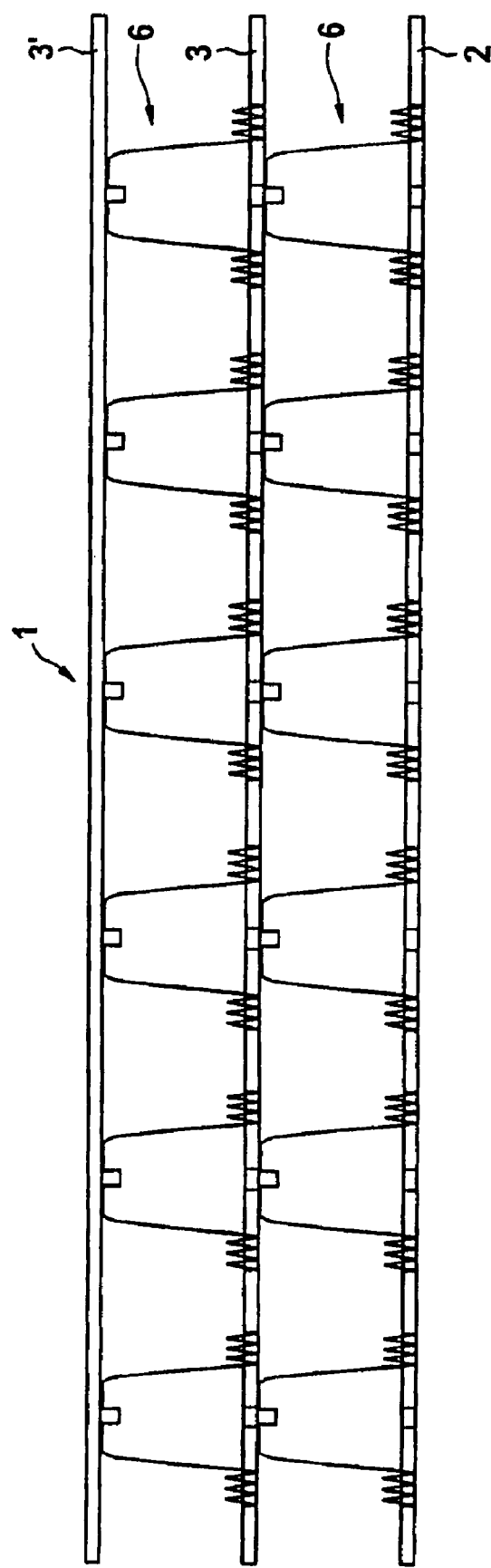
FIG. 5 shows a sectional illustration of an energy absorbing device according to the invention having three elements which can be moved relative to one another.

FIG. 5 shows one exemplary embodiment of the absorbing device 1 according to the invention which differs from the above-described exemplary embodiments in that an additional element 3' is provided which is arranged movably relative to the element 3, the element 3 in turn being arranged movably relative to the element 2. As in conjunction with the above-described exemplary embodiments, springs 6 are arranged between the elements 2 and 3 or 3 and 3', which springs 6 bring about a transfer from the initial position into the end position.

Figure 6:
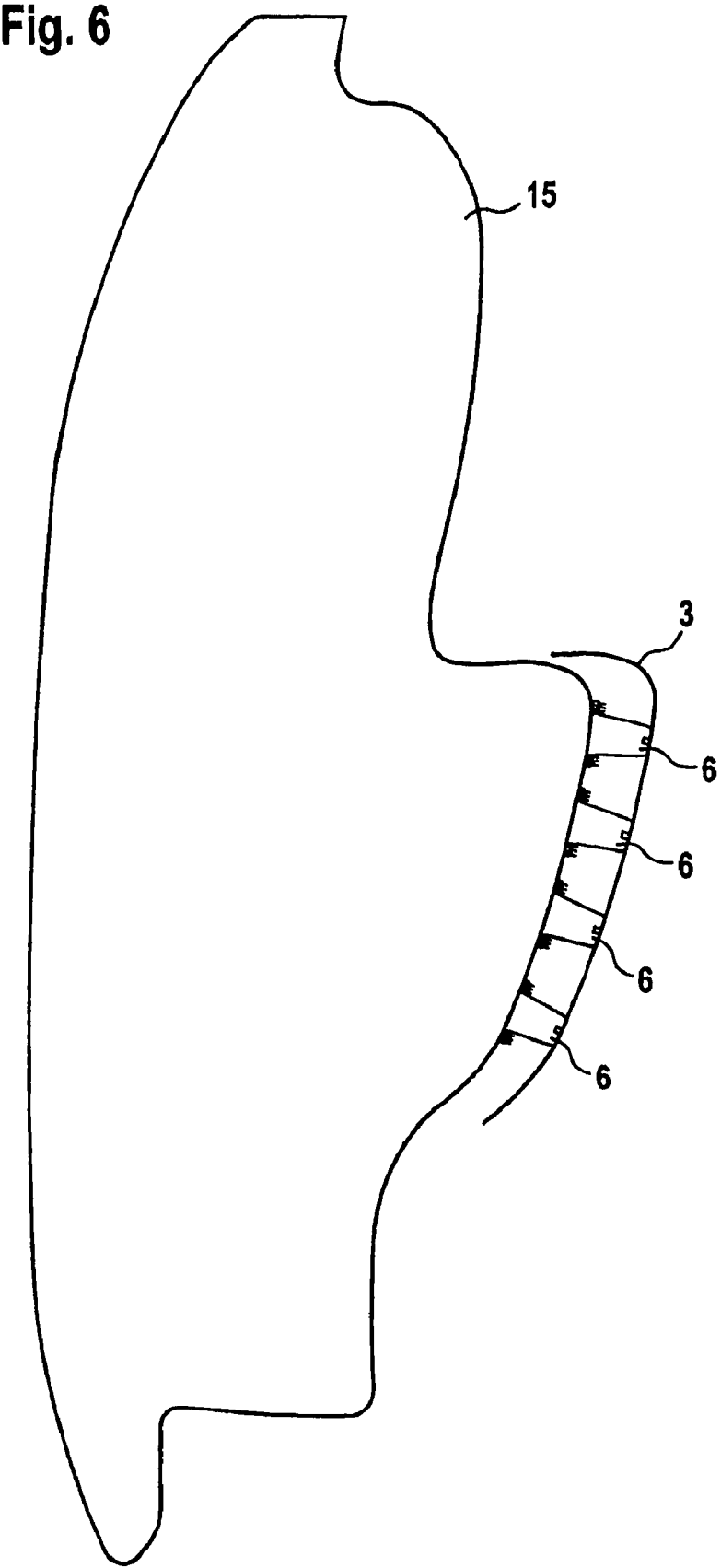
FIG. 6 shows an energy absorbing device according to the invention as a door trim.
Figure 7:
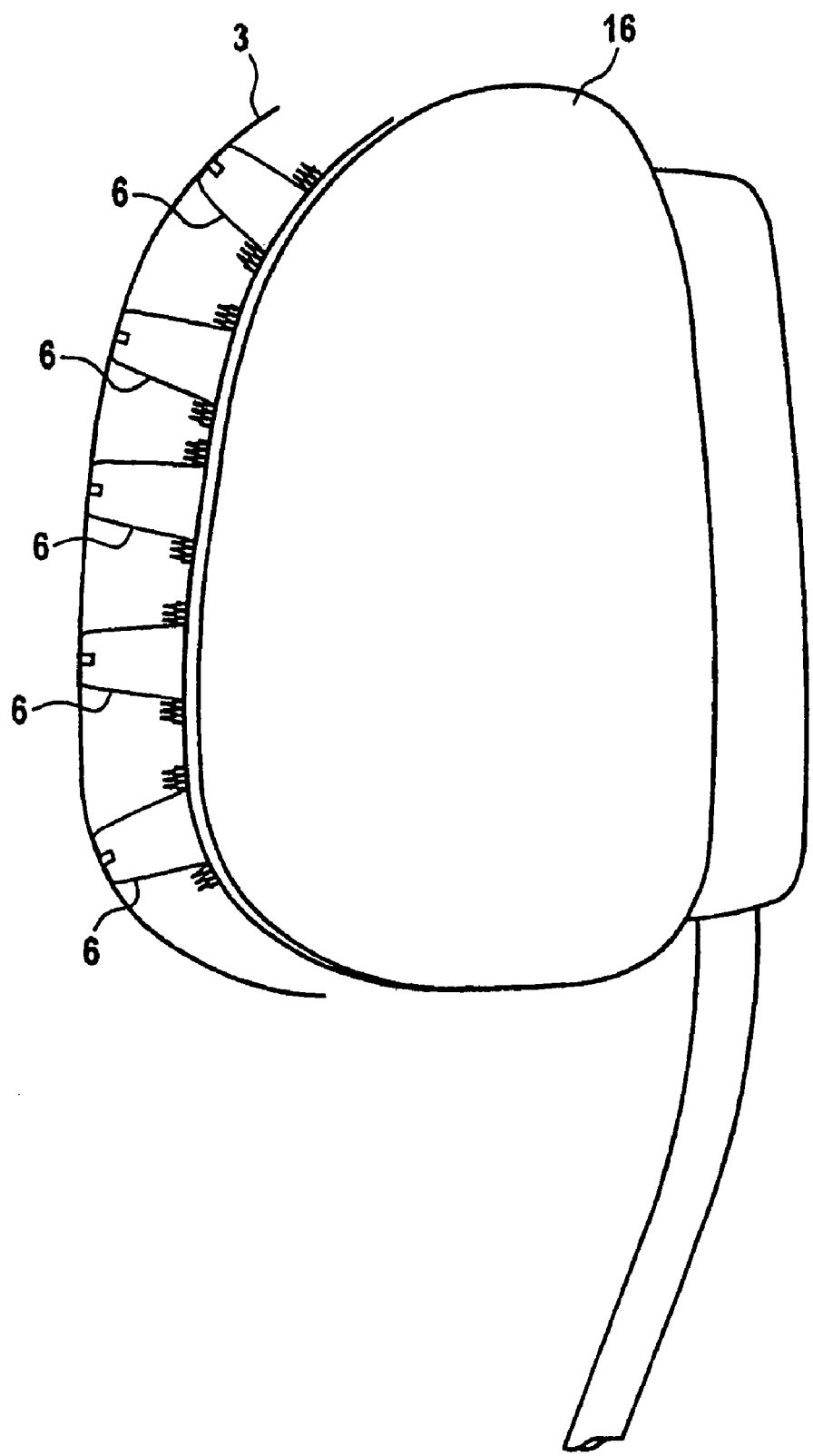
FIG. 7 shows an energy absorbing device according to the invention as part of a headrest.

FIGS. 6 and 7 show exemplary embodiments of the energy absorbing device 1 according to the invention. In one embodiment, for example, it is envisioned to arrange the device on a door 15, the element 3 which can be transferred from an initial position into an end position representing a piece of a door trim, and the springs 6 being arranged between the element 3 and the door. It is likewise envisioned for the energy absorbing device 1 according to an exemplary embodiment of the invention, as shown in FIG. 7, to be configured as part of a headrest 16.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. An energy absorbing device for the interior of a motor vehicle, comprising:
   first and second elements arranged movably relative to one another, of which the first element is fixed to the vehicle and the second element is transferable from an initial position into an end position;
   at least one actuator arranged between the first and second elements; and
   at least one receiving apparatus disposed on the first and second elements for fastening the actuator; wherein
   the at least one actuator is a spring; and
   the receiving apparatus comprises a recess defined by the first and second elements and encloses the spring at least partially.

2. The energy absorbing device as claimed in claim 1, wherein the spring has at least one limb, at least one winding, and at least one hoop.

3. The energy absorbing device as claimed in claim 2, wherein the hoop is arranged between two windings.

4. The energy absorbing device as claimed in claim 3, wherein the at least one limb adjoins those sides of the two windings which lie opposite the at least one hoop.

5. The energy absorbing device as claimed in claim 2, wherein, in order to transfer each of the two elements from the initial position into the end position, the at least one hoop performs a pivoting movement about a pivot axis extending through the at least one winding.

6. The energy absorbing device as claimed in claim 1, wherein the recess acting as receiving apparatus comprises at least one pin.

7. The energy absorbing device as claimed in claim 6, wherein the spring is arranged relative to the receiving apparatus to place the winding in the recess and to enclose the pin.

8. The energy absorbing device as claimed in claim 1, further comprising a stop for limiting a movement of the spring.

9. The energy absorbing device as claimed in claim 8, wherein the stop comprises a projection arranged on one of the two elements.

10. The energy absorbing device as claimed in claim 1, wherein the first and second elements are arranged in a cover.

11. The energy absorbing device as claimed in claim 10, wherein the cover is gas-impermeable.

12. The energy absorbing device as claimed in claim 1, wherein the first and second elements are connected to one another via releasable fixing elements.

13. An interior safety structure of a vehicle, comprising:
   a first element secured to an interior surface of a passenger compartment;
   a second element movably connected to the first element, deployable from an initial position proximal to the first element, to an end position distal from the first element;
   an actuator operatively connected to the first and the second elements, the actuator moving the second element to the end position; and
   a receiving apparatus defining a recess between the first and the second element, the recess at least partially receiving and enclosing the actuator;
   wherein the actuator is a spring.

14. The safety structure according to claim 13, further comprising an element for fixing the second element in the initial position.

15. The safety structure according to claim 14, wherein the fixing element comprises a gas impermeable cover.

16. The safety structure according to claim 14, wherein the fixing element is releasably connected to the first and second elements.

17. The safety structure according to claim 13, wherein the spring urges the second element in the end position.

18. The safety structure according to claim 17, wherein the spring comprises winding portions disposed in the recess and loop portions acting on one of the first and second elements.

19. The safety structure according to claim 18, wherein the winding portions are pivotally connected to another of the first and second elements.

20. The safety structure according to claim 13, wherein the first element is secured to one of a surface of a headrest and an interior surface of a door.

* * * * *